(12) United States Patent
Brill

(10) Patent No.: US 10,877,816 B2
(45) Date of Patent: Dec. 29, 2020

(54) OPTIMAL TASK SCHEDULER

(71) Applicant: Samsung Electronics Co., Ltd, Suwon-si (KR)

(72) Inventor: Frank Z. Brill, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 15/134,287

(22) Filed: Apr. 20, 2016

(65) Prior Publication Data

US 2017/0308411 A1 Oct. 26, 2017

(51) Int. Cl.
*G06F 9/52* (2006.01)
*G06F 9/50* (2006.01)

(52) U.S. Cl.
CPC .............. *G06F 9/52* (2013.01); *G06F 9/5044* (2013.01); *G06F 9/5066* (2013.01); *G06F 9/5094* (2013.01); *Y02D 10/00* (2018.01)

(58) Field of Classification Search
CPC ........ G06F 9/52; G06F 9/5066; G06F 9/5044; G06F 9/5094; Y02D 10/22; Y02D 10/36
See application file for complete search history.

(56) References Cited

U.S. PATENT DOCUMENTS

| | | | | |
|---|---|---|---|---|
| 5,392,430 A * | 2/1995 | Chen | ...................... | G06F 8/451 707/999.003 |
| 6,434,590 B1 * | 8/2002 | Blelloch | ............... | G06F 9/5066 718/102 |
| 7,735,086 B2 * | 6/2010 | Hellerstein | ............... | G06F 8/60 718/105 |
| 8,458,710 B2 * | 6/2013 | Keeton | ................. | G06F 9/4881 718/102 |
| 8,984,520 B2 * | 3/2015 | Liu | ........................ | G06F 1/3203 713/300 |
| 2007/0255929 A1 * | 11/2007 | Kasahara | .............. | G06F 1/3203 712/1 |
| 2008/0066072 A1 * | 3/2008 | Yurekli | ................. | G06Q 10/06 718/104 |
| 2013/0007088 A1 * | 1/2013 | Alfredo | ................. | G06F 9/5066 709/201 |
| 2016/0357610 A1 * | 12/2016 | Bartfai-Walcott | .... | G06F 9/5061 |

OTHER PUBLICATIONS

Hamid Arabnejad, et al., "List Scheduling Algorithm for Heterogeneous Systems by an Optimistic Cost Table," IEEE Transactions on Parallel and Distributed Systems, vol. 25, No. 3, Mar. 2014, pp. 682-694.

* cited by examiner

*Primary Examiner* — Jung W Kim
*Assistant Examiner* — Bruce S Ashley

(57) ABSTRACT

A method includes obtaining a plurality of tasks, where certain tasks have a dependency relationship to other tasks. The method also includes arranging the tasks into multiple levels based on the dependency relationships between the tasks, each level having at least one task. The method further includes, for a particular level, determining a list of possible assignment scenarios of the at least one task of the level to multiple processing devices, determining a cost for each of the assignment scenarios, and selecting the assignment scenario having a lowest cost. Each assignment scenario includes an assignment of each of the at least one task of the level to one of the processing devices. The method includes also building a schedule by assigning the tasks to the processing devices based on the selected assignment scenarios.

30 Claims, 6 Drawing Sheets

OPTIMAL TASK SCHEDULER

TECHNICAL FIELD

This disclosure relates generally to execution of algorithms by one or more processors, and more specifically to an optimal task scheduler for automatically and optimally scheduling and executing data flow algorithms for a heterogeneous multi-processor system.

BACKGROUND

Typical imaging and vision applications have high processing and data bandwidth requirements for real-time or near-real-time performance. Achieving acceptable performance requires highly-optimized programming, often leveraging special-purpose hardware. This is especially true on mobile platforms, where the performance and power limitations are critical. Typically the optimization is done manually, and is tedious, time-consuming, error-prone, and non-portable. The benefits of using a standard "optimized" software library are limited, since a major component of the optimization is to minimize data movement between functions, which cannot be expressed well in a general-purpose function library.

SUMMARY

This disclosure provides a system and method for automatically and optimally scheduling and executing data flow algorithms.

In a first embodiment, a method includes obtaining a plurality of tasks, wherein certain ones of the tasks have a dependency relationship to other ones of the tasks. The method also includes arranging the tasks into multiple levels based on the dependency relationships between the tasks, each level having at least one task. The method further includes, for a particular level, determining a list of possible assignment scenarios of the at least one task of the level to multiple processing devices, determining a cost for each of the assignment scenarios, and selecting the assignment scenario having a lowest cost, wherein each assignment scenario includes an assignment of each of the at least one task of the level to one of the multiple processing devices. In addition, the method includes building a schedule by assigning the plurality of tasks to the multiple processing devices based on the selected assignment scenarios.

In a second embodiment, an apparatus is provided. The apparatus includes at least one memory and at least one processor. The at least one processor is configured to obtain a plurality of tasks, wherein certain ones of the tasks have a dependency relationship to other ones of the tasks. The at least one processor is also configured to arrange the tasks into multiple levels based on the dependency relationships between the tasks, each level having at least one task. The at least one processor is further configured to, for a particular level, determine a list of possible assignment scenarios of the at least one task of the level to multiple processing devices, determine a cost for each of the assignment scenarios, and select the assignment scenario having a lowest cost, wherein each assignment scenario includes an assignment of each of the at least one task of the level to one of the multiple processing devices. In addition, the at least one processor is configured to build a schedule by assigning the plurality of tasks to the multiple processing devices based on the selected assignment scenarios.

In a third embodiment, a non-transitory computer readable medium embodying a computer program is provided. The computer program includes computer readable program code that, when executed by a processor, causes the processor to obtain a plurality of tasks, wherein certain ones of the tasks have a dependency relationship to other ones of the tasks. The computer program also includes computer readable program code that, when executed by a processor, causes the processor to arrange the tasks into multiple levels based on the dependency relationships between the tasks, each level having at least one task. The computer program further includes computer readable program code that, when executed by a processor, causes the processor to, for a particular level, determine a list of possible assignment scenarios of the at least one task of the level to multiple processing devices, determine a cost for each of the assignment scenarios, and select the assignment scenario having a lowest cost, wherein each assignment scenario includes an assignment of each of the at least one task of the level to one of the multiple processing devices. In addition, the computer program includes computer readable program code that, when executed by a processor, causes the processor to build a schedule by assigning the plurality of tasks to the multiple processing devices based on the selected assignment scenarios.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to, e.g., any direct or indirect communication between two or more elements, whether or not those elements are in physical contact with one another. The terms "transmit," "receive," and "communicate," as well as derivatives thereof, encompass, e.g., both direct and indirect communication. The terms "include" and "comprise," as well as derivatives thereof, mean inclusion without limitation. The term "or" is inclusive, meaning and/or. The phrase "associated with," as well as derivatives thereof, means, e.g., to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means, e.g., any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Complex, data-intensive operations, such as data flow algorithms associated with image and vision processing, can include dozens, hundreds, or thousands of tasks or instructions that must be executed in a correct sequence in order to generate a suitable result. Depending on the executing system or hardware, multiple processing devices, such as individual processing elements in a multi-core processor, may be available to concurrently execute one or more of the required tasks. Such multiple processing devices may be heterogeneous, meaning they may include different hardware and may have different processing capabilities, e.g., with respect to processing speed, throughput, and the like. When multiple processing devices are available to execute different tasks for complex operations, it may be necessary to schedule the tasks and assign the tasks to the different processing devices.

One or more embodiments described herein provide a system and method that take a data-intensive application, such as a computer vision or imaging application, and automatically produce an execution plan, also referred to as a schedule, that assigns the functions in the data flow graph to the available processing resources in a way that maximizes performance while minimizing data movement and power consumption. Also provided are a system and method for efficiently executing the schedule on distributed, heterogeneous processing environments.

Figure 1:
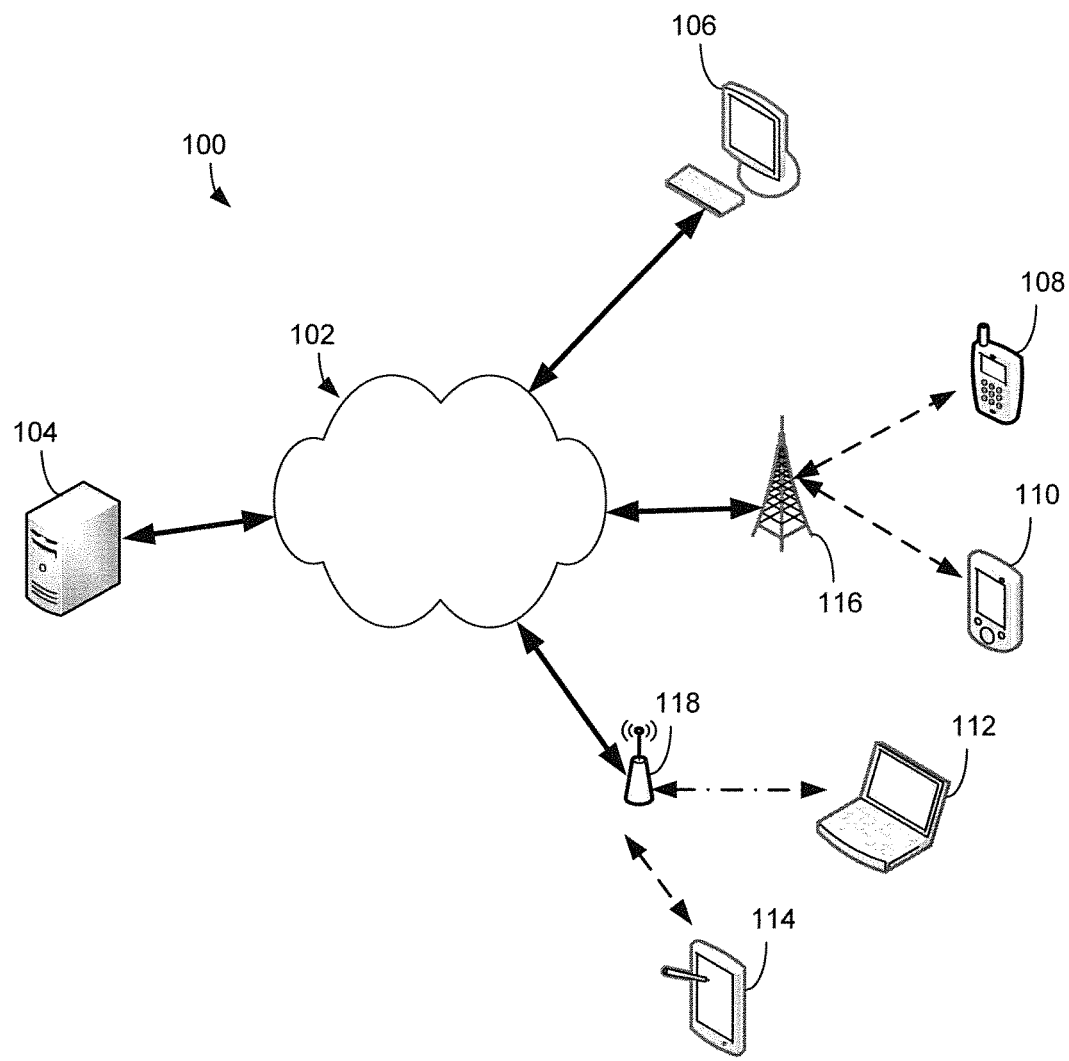
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 can be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-116. Each server 104 includes any suitable computing or processing device that can provide computing services for one or more client devices. Each server 104 can, for example, include one or more processing devices, one or more memories storing instructions and data, and one or more network interfaces facilitating communication over the network 102.

Each client device 106-116 represents any suitable computing or processing device that interacts with at least one server or other computing device(s) over the network 102. In this example, the client devices 106-116 include a desktop computer 106, a mobile telephone or smartphone 108, a personal digital assistant (PDA) 110, a laptop computer 112, a tablet computer 114, and a UHDTV 116. However, any other or additional client devices can be used in the computing system 100.

In this example, some client devices 106-116 communicate indirectly with the network 102. For example, the client devices 108-110 communicate via one or more base stations 118, such as cellular base stations or eNodeBs. Also, the client devices 112-116 communicate via one or more wireless access points 120, such as IEEE 802.11 wireless access points. Note that these are for illustration only and that each client device can communicate directly with the network 102 or indirectly with the network 102 via any suitable intermediate device(s) or network(s). In certain embodiments, one or more client devices 106-116 can communicate with network 102 or server 104 via one or more satellite systems.

As described in more detail below, one or more of the server 104 and the client devices 106-116 are configured to automatically and optimally schedule or execute one or more data flow algorithms for a heterogeneous multi-processor system.

Although FIG. 1 illustrates one example of a computing system 100, various changes may be made to FIG. 1. For example, the system 100 can include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features can be used in any other suitable system.

Figure 2:
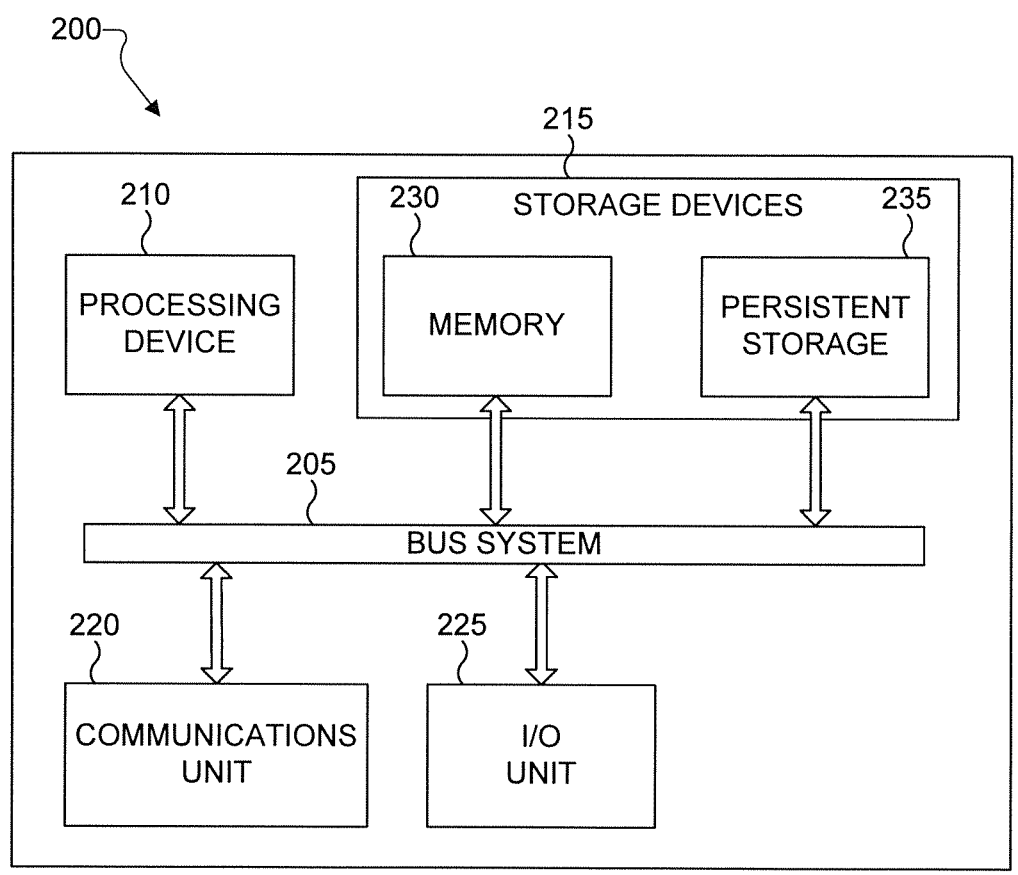
FIGS. 2 and 3 illustrate example devices in a computing system according to this disclosure.
Figure 3:
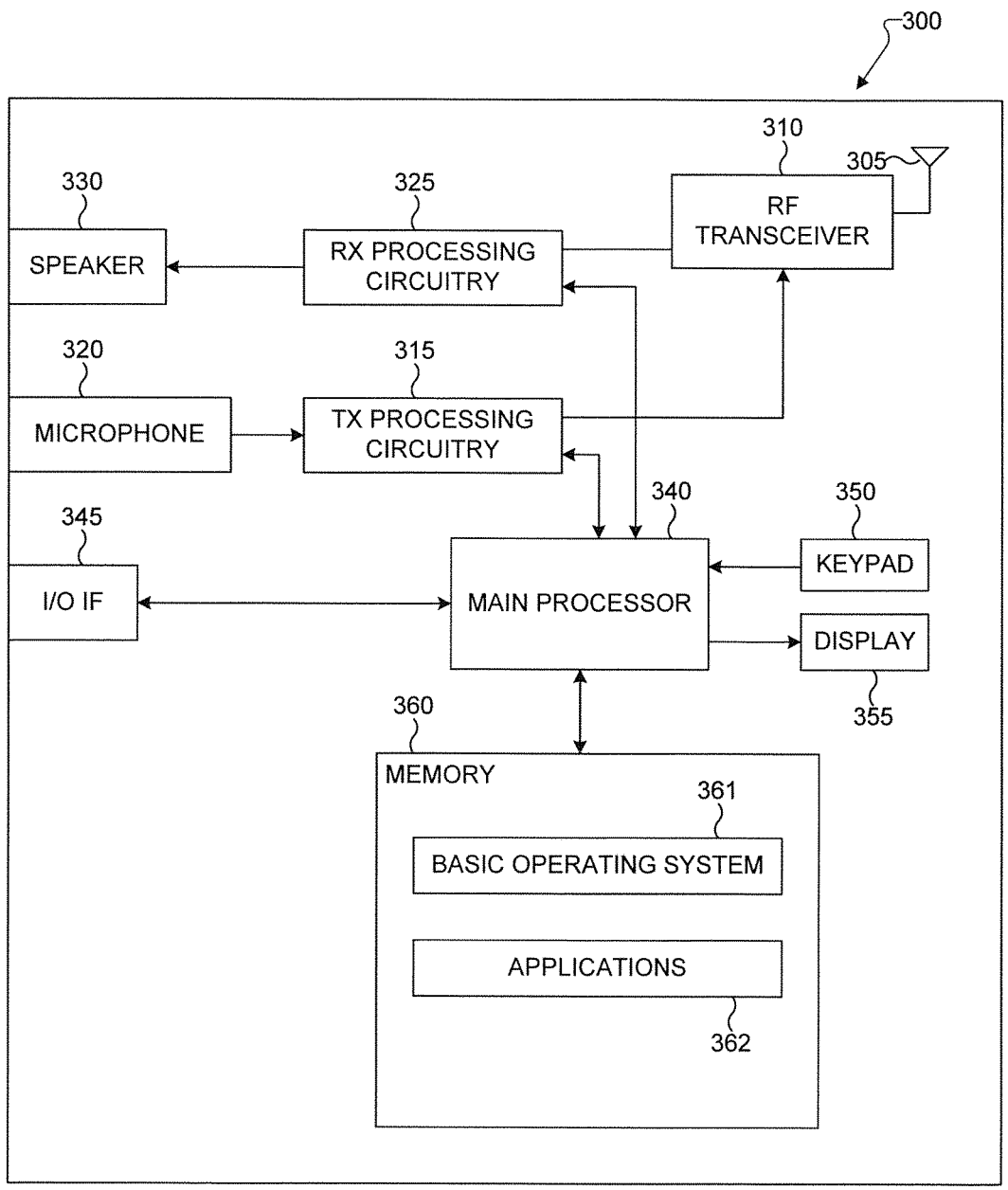

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, central processing units (CPUs), graphics processing units (GPUs), digital signal processors (DSPs), field programmable gate arrays, application specific integrated circuits, hardware accelerators, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main processor 340.

The main processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

The main processor 340, the TX processing circuitry 315, and the RX processing circuitry 325 may include any suitable number(s) and type(s) of processors or other processing devices in any suitable arrangement. For example, each of the main processor 340, the TX processing circuitry 315, and the RX processing circuitry 325 may include one or more microprocessors, microcontrollers, central processing units (CPUs), graphics processing units (GPUs), digital signal processors (DSPs), field programmable gate arrays, application specific integrated circuits, hardware accelerators, and discrete circuitry.

Figure 6:
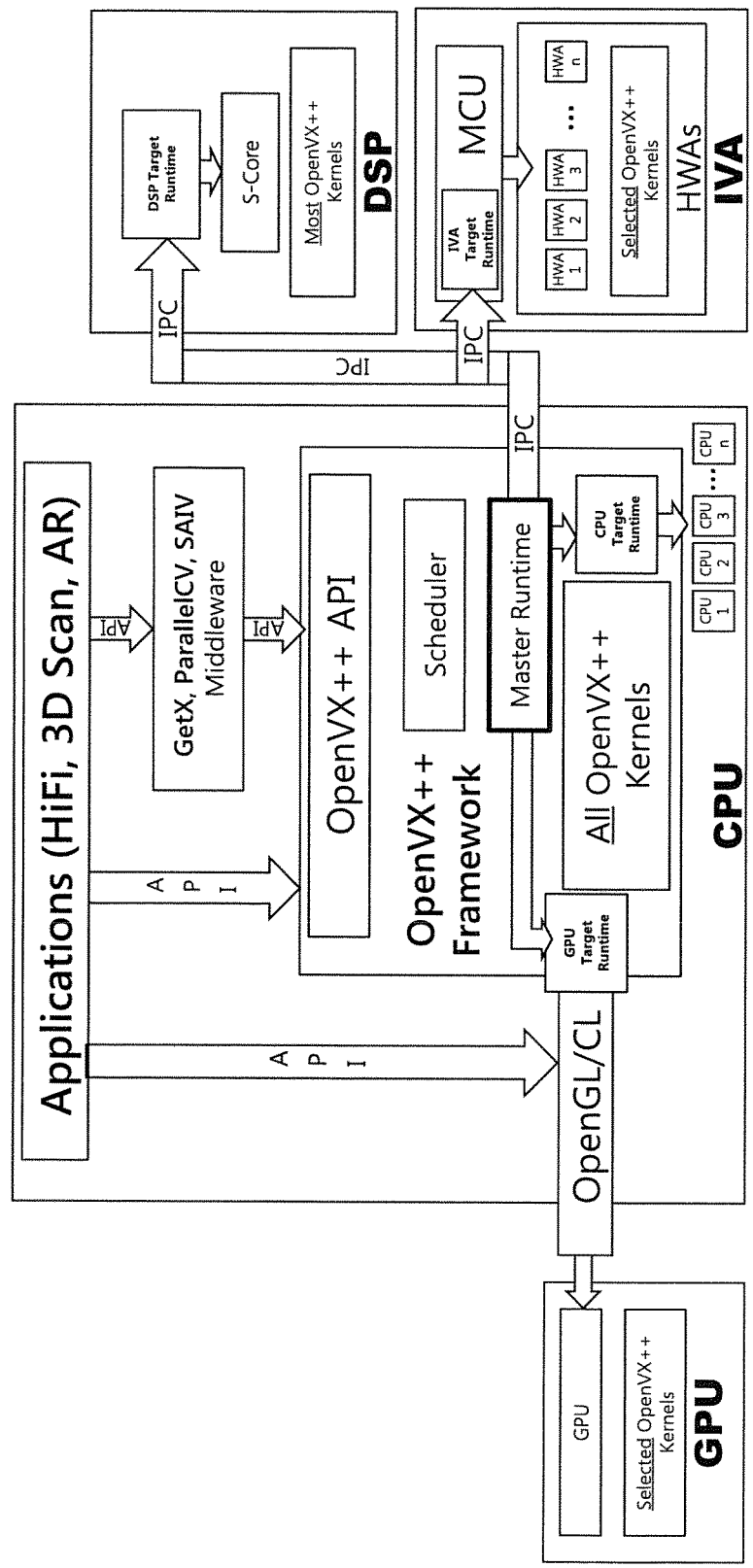
FIG. 6 illustrates an example of a system on a chip (SoC) having multiple heterogeneous processing devices.

As described above and in greater detail below, the server 200 and the client device 300 can each include multiple processing devices. These processing devices can execute tasks or instructions for complex operations, such as image and vision processing. The multiple processing devices in the server 200 or client device 300 may be heterogeneous, meaning they may include different hardware and may have different processing capabilities, e.g., with respect to processing speed, throughput, and the like. In particular embodiments, some of the multiple processing devices in the server 200 or client device 300 may represent heterogeneous multi-core processors, such as in a system on a chip (SoC). FIG. 6 illustrates one example of such a SoC having multiple processing devices. When multiple processing devices are available to execute different tasks for complex operations, it may be necessary to schedule the tasks and assign the tasks to different processing devices. For example, the server 200 and the client device 300 may each include multiple heterogeneous processing devices that can be scheduled to perform different tasks for complex operations.

In addition, the server 200, the client device 300, or both may operate to perform the functions of a scheduler that schedules different tasks for complex operations to multiple heterogeneous processing devices. In accordance with this disclosure, the scheduler knows each task to be performed, and also knows what processing device(s) are capable of completing each task. The scheduler assigns each task to a particular processing device based on the capabilities of the various processing devices and the costs for executing each of the tasks. For example, some processing devices (e.g., a CPU) can complete almost any task. Other processing devices (e.g., a GPU or a DSP) can only process certain types of tasks. Some processing devices may be capable of performing a variety of tasks but are optimized for particular tasks.

A naïve method to generate a schedule is to simply assign all tasks to the fastest processing devices. However, when such a method is used, the overall cost might be higher, since faster processing devices may use more power or memory to operate. Also, such a scheme may leave slower processing devices underutilized. In some cases, it may be a better utilization of the whole system for a slower processing device to perform a task. For example, if processing device 1 is faster than processing device 2 and both processing devices are capable of completing task A, it might make sense for slower processing device 2 to complete task A if faster processing device 1 is needed to complete a more complex task B concurrently. The scheduler described in the following embodiments is capable of making such determinations by considering the tasks, the capabilities of each processing device, and the costs of different processing devices executing different tasks, as described in greater detail below.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
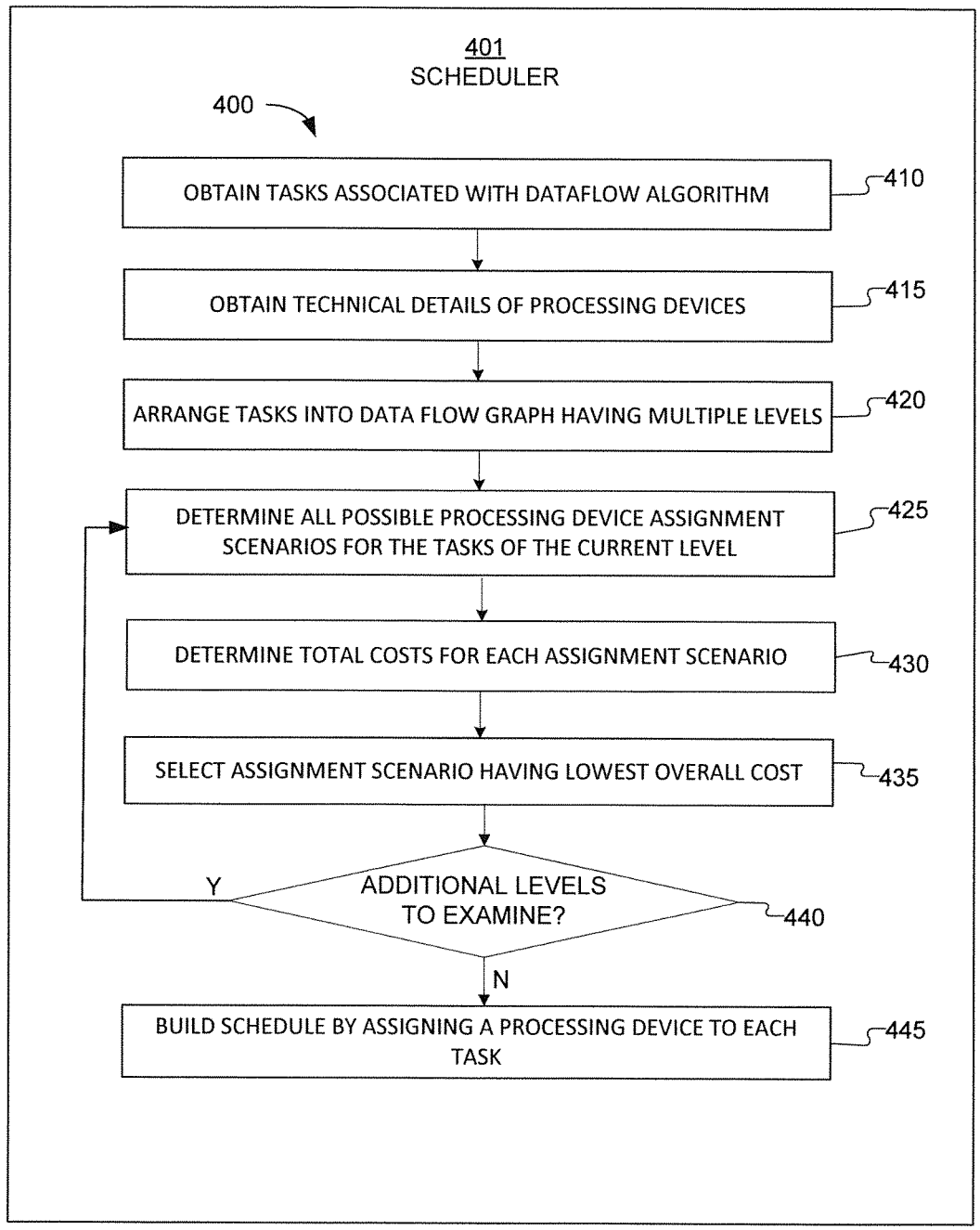
FIG. 4 illustrates an example method for scheduling multiple tasks of a complex data flow algorithm to multiple heterogeneous processing devices, according to this disclosure.

FIG. 4 illustrates an example method 400 for scheduling multiple tasks of a complex data flow algorithm to multiple heterogeneous processing devices, according to this disclosure. For ease of explanation, the method 400 is described as being performed using a scheduler 401. In the method 400, the scheduler 401 takes a list of tasks to be performed as part of the algorithm and outputs a schedule. As used herein, a task is a process, task, or instruction that is to be executed by one or more processing devices in conjunction with a complex data flow algorithm, such as an algorithm associated with image and vision processing. For ease of discussion, each process, task, or instruction will be referred to hereforward simply as a task.

In some embodiments, the scheduler 401 may include a master processing device that is relatively powerful, due to the computations required for the scheduling. In some embodiments, the scheduler 401 may represent one or more processing devices in the device that will perform the overall algorithm. In other embodiments, the scheduler 401 may represent one or more processing devices in a device separate from the device that will perform the overall algorithm. In particular embodiments, the scheduler 401 may be a network device, such as the server 104 or one of the client devices 106-114 of FIG. 1. However, the method 400 could be used with any suitable device or system.

At operation 410, the scheduler 401 obtains a list of tasks associated with a complex data flow algorithm. This may include the scheduler 401 receiving the list of tasks by querying a data table in a database, receiving the list of tasks in a data message transmitted to the scheduler 401, or by any other suitable method. This may also include the scheduler 401 receiving and reviewing dependencies between the tasks in the list, as described below.

At operation 415, the scheduler 401 obtains technical details of the processing devices that can execute the tasks of the algorithm. This may include the scheduler 401 obtaining a list of all processing devices in the system, a list of tasks each processing device can execute, and the performance of each task when executed by each processing device, including processing time, power consumption, and any other relevant resource consumption information (e.g., memory requirements). The technical details also include the memory available for each processing device, where the memory is located, what performance characteristics the memory has, and the costs in terms of power, performance, and resource consumption (e.g., DMA channels) required to move data from one memory area to another. The performance and memory information for each processing device can be empirically determined in advance and stored in a table or library and accessed, e.g., via an API.

At operation 420, the scheduler 401 arranges the tasks into a topologically sorted data flow graph. In general, a data flow graph is a data structure consisting of nodes and links. Each node represents a task, and each link represents the data flow relationship between two nodes. For example, if Node-A produces an output image called out-A, and Node-B takes out-A as an input and produces out-B, then there is a direct link between the output of A and the input of B, with A being the producer and B being the consumer. Nodes and links can be added to create graphs of arbitrary complexity.

Figure 5:
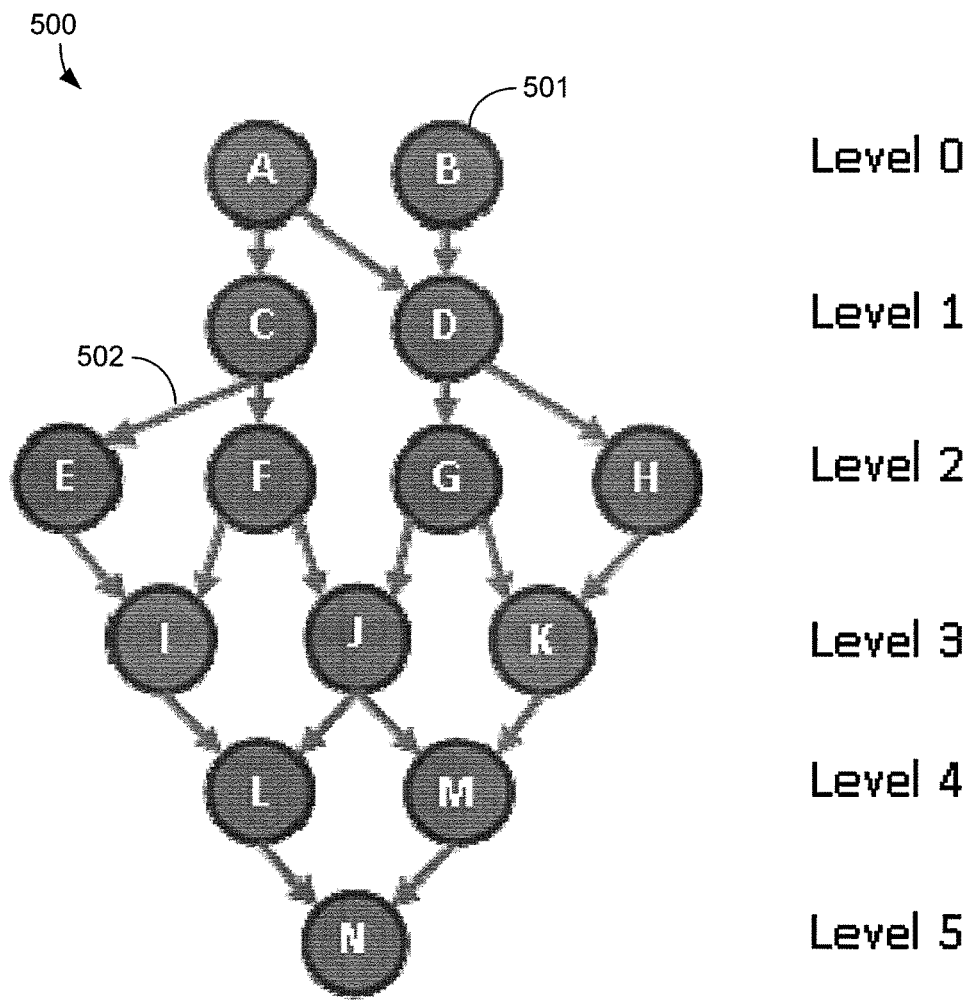
FIG. 5 shows a data flow graph having a plurality of nodes according to this disclosure.

FIG. 5 shows a data flow graph 500 having a plurality of nodes 501 according to this disclosure. Each node 501 represents a task that is to be executed by one or more processing devices in conjunction with a complex data flow algorithm. The arrows 502 in the data flow graph 500 represent the dependency or hierarchy links between the nodes 501. For example, task C consumes data that is provided by task A. Therefore, task C depends from task A, and task A must be performed before task C. Tasks G and H depend from task D. That is, once task D is completed, tasks G and H can be completed. The data flow graph 500 is arranged into six levels: Level 0 through Level 5. Each task is assigned to one level. Tasks that do not have any dependencies (e.g., task A and task B) are on Level 0. Tasks in Level 1 can be performed once the parent tasks in Level 0 are completed. In general, tasks at the same level have no specific required order and can be performed concurrently.

Once the data flow graph 500 is generated, the scheduler 401 performs the following operations 425 through 435 for each level in the data flow graph 500, starting at level 0.

At operation 425, the scheduler 401 determines a list of all possible processing device assignment scenarios for the tasks of the current level. The list is determined based on which processing devices are capable of performing each task. For example, consider the tasks of level 0 shown in FIG. 5 (tasks A and B), and assume that the processing devices determined in operation 415 include a CPU and a DSP. Both the CPU and the DSP can perform tasks A and B. In such a scenario, the possible assignment scenarios for Level 0 are as shown in Table 1, with processing times included in the table. If a particular processing device is not capable of performing a task, then that processing device/task combination is not included in the list. For example, a GPU may not be capable of performing certain non-graphics related tasks.

TABLE 1

| Assignment scenario | Task A | Task B | Time for Task A | Time for Task B | Sequential or Concurrent |
|---|---|---|---|---|---|
| 1 | CPU | CPU | 100 ms | 90 ms | Sequential |
| 2 | CPU | DSP | 100 ms | 50 ms | Concurrent |
| 3 | DSP | CPU | 75 ms | 90 ms | Concurrent |
| 4 | DSP | DSP | 75 ms | 50 ms | Sequential |

At operation 430, the scheduler 401 determines the costs for each assignment scenario among the group of possible assignment scenarios determined in operation 425. In some embodiments, the cost of each assignment is based only on overall execution time. In Table 1, assignment scenario (3) has the lowest cost because it is the lowest elapsed time of completion (90 ms because the DSP and the CPU can perform their respective tasks concurrently). In other embodiments, the cost of each assignment may be based on overall execution time and power consumed by all processing devices. In such a case, the costs may include a number of milliseconds and a number of millivolts or milliwatts-hours. In still other embodiments, the cost of each assignment may be based on other or additional characteristics, such as memory usage or bandwidth. In embodiments where multiple characteristics are used, the multiple characteristics may be weighted or prioritized according to greatest importance (e.g., execution time may be of greater importance than power consumed, thus execution time is given a greater weighting in determining an overall cost).

In addition to determining the costs of performing task A and task B as shown in Table 1, the scheduler 401 also uses one or more heuristic techniques to quickly estimate the costs to complete all remaining tasks in order to determine a total estimated cost for each assignment scenario. For example, once the costs for task A and task B are determined as shown in Table 1, the costs for completing tasks C through N can be quickly estimated using heuristic techniques and added to the costs for task A and task B to determine a total estimated cost for the whole complex data flow algorithm, which includes all of tasks A through N. The estimated cost for tasks C through N is determined multiple times—once for each assignment scenario in Table 1. For example, in assignment scenario (1), it is assumed that the CPU performs both task A and task B. Then the cost of completing tasks C through N is estimated based on the assumption that the CPU completes tasks A and B. Then, in assignment scenario (2), it is assumed that the CPU performs task A and the DSP performs task B. Then the cost of completing tasks C through N is estimated based on the assumption that the CPU completes task A and the DSP completes task B. The heuristic techniques may assume that the fastest processor is used for all of the remaining tasks C through N. Thus, the heuristic estimate is typically an underestimate. If the heuristic estimate is an underestimate, the A* (or "A star") search algorithm can produce an optimal result. The method 400 conforms to the requirements of the A* algorithm, so the method 400 produces an optimal result as long as the heuristic estimate is an underestimate.

At operation 435, the scheduler 401 selects the assignment scenario having the lowest overall cost, considering both the costs of the tasks in the current level (e.g., task A and task B) and also the estimated costs of the tasks in the remaining levels (tasks C through N). The scheduler 401 uses the assignments in the selected assignment scenario for the computations in the next level. For example, using the information in Table 1, the scheduler 401 selects assignment scenario (3) and assumes that task A and task B will be assigned according to assignment scenario (3).

At operation 440, it is determined if there are more levels to examine in the data flow graph. If it is determined that there are more levels to examine, then the scheduler 401 returns to operation 425 for the next level.

The determination of assignment scenarios and costs in operations 425 through 435 for each subsequent level beyond the first level (i.e., level 0) does not consider only the tasks of that current level. Instead, the determination for each level also considers the impact that assignments in the earlier levels have on the current level. For example, once level 0 has been examined and a lowest cost assignment scenario has been determined for level 0, the scheduler 401 processes level 1 tasks C and D. While one assignment scenario for tasks C and D may appear to have the lowest cost on its own, when considered with the assignment scenario for task A and B, the "lowest cost" assignments for tasks C and D might not actually be the lowest cost overall for tasks A through D. As an illustrative example, the use of the DSP for Task A (as specified in assignment scenario (3) in Table 1) may render the DSP unsuitable for both task C and task D. Thus, the determination of assignment scenarios and costs in operations 425 through 435 for level 1 tasks C and D may include considering alternative assignments for level 0 tasks A and B (e.g., assignments that do not include using the DSP for Task A).

Turning again to operation 440, if it is determined that there are no more levels to examine, then the scheduler 401 moves to operation 445 and builds a schedule by making an assignment of a processing device for each task in the data flow graph. The assignments are based on the lowest cost assignment scenarios determined in operation 435 for each of the levels in the data flow graph. For example, in the data flow graph 500, the scheduler 401 makes an assignment of a processing device for each task A through N based on the lowest cost assignment scenarios determined for each of levels 0 through 5.

In general, the tasks of each level are considered together because they can be executed concurrently once their parent tasks have been completed. In some embodiments, certain tasks in a level may be ready to be performed before tasks in an earlier level have been completed. For example, in the data flow graph 500, tasks A and C may be simple tasks, while task B may be very complicated with many computation steps. If the scheduler 401 determines assignment scenarios in operations 425 through 435 in which tasks A and C can be completed quickly, then task C could be completed before complicated task B is finished. In such a case, a level 1 task (task C) may finish execution before a level 0 task (task B) is completed.

To accommodate such cases, the scheduler 401 can disregard a strict adherence to the levels of the data flow graph and can instead consider tasks in a frontier. A frontier represents a group of tasks that are ready to be performed next because all of their parent tasks have been completed. For example, in the data flow graph 500, if tasks A and C can be completed before task B is completed, then the frontier (after tasks A, B, and C) is comprised of tasks E, F, and D. The scheduler 401 can perform operations 425 through 435 using tasks in each frontier rather than the tasks in each level.

Although FIG. 4 illustrates one example of a method 400 for scheduling multiple tasks of a complex data flow algorithm to multiple heterogeneous processing devices, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for scheduling tasks, the method comprising:
identifying a plurality of tasks, wherein certain ones of the tasks have hierarchical-dependency relationships to other ones of the tasks;
arranging the plurality of tasks into multiple levels based on the hierarchical-dependency relationships between the tasks, each level having at least one task;
assigning a weight to each of multiple resource characteristics associated with each of the tasks, the resource characteristics associated with each task including an execution time of the task, a power consumption to perform the task, a memory usage to perform the task, and a bandwidth to perform the task;
for each of different particular levels of the multiple levels:
determining a list of possible assignment scenarios of the at least one task of the particular level to multiple processing devices as a function of technical capabilities of the multiple processing devices, wherein each assignment scenario includes an assignment of each of the at least one task of the particular level to one of the multiple processing devices,
determining a resource cost of each of the assignment scenarios based on (i) the assigned weights of the resource characteristics associated with the at least one task of the particular level, (ii) the assignments of the at least one task of the particular level to the multiple processing devices in the assignment scenarios, and (iii) an estimated task cost for each of the tasks that is at a subsequent level beyond the particular level based on the hierarchical-dependency relationships, and
selecting, for the particular level, the assignment scenario having a lowest resource cost by considering (i) the determined resource costs of the assignment scenarios for the particular level and (ii) the determined resource costs of the assignment scenarios for any other level that includes one or more tasks that must be performed earlier than the at least one task of the particular level based on the hierarchical-dependency relationships;
building a schedule by assigning the plurality of tasks to the multiple processing devices based on the selected assignment scenario for each of the particular levels, the schedule configured to minimize power consumption of the multiple processing devices; and
executing one or more of the plurality of tasks based on the assignment.

2. The method of claim 1, wherein the multiple processing devices comprise at least one of: a central processing unit (CPU), a graphics processing unit (GPU), a digital signal processor (DSP), or a core processor in a multi-core processor.

3. The method of claim 1, further comprising:
determining the technical capabilities by obtaining technical details of each of the multiple processing devices before determining the resource costs of the assignment scenarios.

4. The method of claim 1, wherein determining the resource cost of each of the assignment scenarios comprises at least one of:
determining a time for at least one of the assigned processing devices to perform the at least one task; and
determining an overall power consumed for at least one of the assigned processing devices to perform the at least one task.

5. The method of claim 1, wherein the estimated task cost for each of the tasks that is at the subsequent level beyond the particular level is estimated using a heuristic technique that assumes that a fastest processor is used to perform that task.

6. The method of claim 1, wherein determining the resource costs comprises:
arranging two or more of the tasks into one or more frontiers, each frontier comprising a plurality of tasks whose parent tasks have all been completed; and
for each of the one or more frontiers, determining the list of possible assignment scenarios of the tasks of the frontier to the multiple processing devices, determining the resource cost for each of the assignment scenarios, and selecting the assignment scenario having the lowest resource cost, wherein each assignment scenario includes an assignment of each of the tasks of the frontier to one of the multiple processing devices, and wherein the schedule is built based on the selected assignment scenarios in all levels and frontiers.

7. The method of claim 1, wherein the plurality of tasks are associated with a data flow algorithm associated with an imaging or vision application.

8. The method of claim 1, wherein determining the list of possible assignment scenarios of the at least one task of the particular level to the multiple processing devices comprises:
   determining which of the multiple processing devices is capable of performing each of the at least one task of the particular level; and
   excluding from the list of possible assignment scenarios a combination of a specific processing device and a specific task when the specific processing device is not capable of performing the specific task.

9. The method of claim 1, wherein the resource cost for a particular processing device to perform a particular task is empirically determined.

10. The method of claim 1, wherein:
    the plurality of tasks are associated with a data flow algorithm, and
    the tasks are arranged into a data flow graph comprising the multiple levels.

11. An apparatus comprising:
    at least one memory; and
    at least one processor configured to:
       identify a plurality of tasks, wherein certain ones of the tasks have hierarchical-dependency relationships to other ones of the tasks;
       arrange the plurality of tasks into multiple levels based on the hierarchical-dependency relationships between the tasks, each level having at least one task;
       assign a weight to each of multiple resource characteristics associated with each of the tasks, the resource characteristics associated with each task including an execution time of the task, a power consumption to perform the task, a memory usage to perform the task, and a bandwidth to perform the task;
       for each of different particular levels of the multiple levels:
          determine a list of possible assignment scenarios of the at least one task of the particular level to multiple processing devices as a function of technical capabilities of the multiple processing devices, wherein each assignment scenario includes an assignment of each of the at least one task of the particular level to one of the multiple processing devices,
          determine a resource cost of each of the assignment scenarios based on (i) the assigned weights of the resource characteristics associated with the at least one task of the particular level, (ii) the assignments of the at least one task of the particular level to the multiple processing devices in the assignment scenarios, and (iii) an estimated task cost for each of the tasks that is at a subsequent level beyond the particular level based on the hierarchical-dependency relationships, and
          select, for the particular level, the assignment scenario having a lowest resource cost by considering (i) the determined resource costs of the assignment scenarios for the particular level and (ii) the determined resource costs of the assignment scenarios for any other level that includes one or more tasks that must be performed earlier than the at least one task of the particular level based on the hierarchical-dependency relationships;
       build a schedule by assigning the plurality of tasks to the multiple processing devices based on the selected assignment scenario for each of the particular levels, the schedule configured to minimize power consumption of the multiple processing devices; and
       execute one or more of the plurality of tasks based on the assignment.

12. The apparatus of claim 11, wherein the multiple processing devices comprise at least one of: a central processing unit (CPU), a graphics processing unit (GPU), a digital signal processor (DSP), or a core processor in a multi-core processor.

13. The apparatus of claim 11, wherein the at least one processor is further configured to determine the technical capabilities by obtaining technical details of each of the multiple processing devices before determining the resource costs of the assignment scenarios.

14. The apparatus of claim 11, wherein the at least one processor is configured to determine the resource cost of each of the assignment scenarios by at least one of:
    determining a time for at least one of the assigned processing devices to perform the at least one task; and
    determining an overall power consumed for at least one of the assigned processing devices to perform the at least one task.

15. The apparatus of claim 11, wherein the estimated task cost for each of the tasks that is at the subsequent level beyond the particular level is estimated using a heuristic technique that assumes that a fastest processor is used to perform that task.

16. The apparatus of claim 11, wherein the at least one processor is further configured to:
    arrange two or more of the tasks into one or more frontiers, each frontier comprising a plurality of tasks whose parent tasks have all been completed; and
    for each of the one or more frontiers, determine the list of possible assignment scenarios of the tasks of the frontier to the multiple processing devices, determine the resource cost for each of the assignment scenarios, and select the assignment scenario having the lowest resource cost, wherein each assignment scenario includes an assignment of each of the tasks of the frontier to one of the multiple processing devices, and
    wherein the schedule is built based on the selected assignment scenarios in all levels and frontiers.

17. The apparatus of claim 11, wherein the plurality of tasks are associated with a data flow algorithm associated with an imaging or vision application.

18. The apparatus of claim 11, wherein the at least one processor is configured to determine the list of possible assignment scenarios of the at least one task of the particular level to the multiple processing devices by:
    determining which of the multiple processing devices is capable of performing each of the at least one task of the particular level; and
    excluding from the list of possible assignment scenarios a combination of a specific processing device and a specific task when the specific processing device is not capable of performing the specific task.

19. The apparatus of claim 11, wherein the resource cost for a particular processing device to perform a particular task is empirically determined.

20. The apparatus of claim 11, wherein:
    the plurality of tasks are associated with a data flow algorithm, and
    the tasks are arranged into a data flow graph comprising the multiple levels.

21. A non-transitory computer readable medium embodying a computer program, the computer program comprising computer readable program code that, when executed, causes at least one processor to:
  identify a plurality of tasks, wherein certain ones of the tasks have hierarchical-dependency relationships to other ones of the tasks;
  arrange the plurality of tasks into multiple levels based on the hierarchical-dependency relationships between the tasks, each level having at least one task;
  assign a weight to each of multiple resource characteristics associated with each of the tasks, the resource characteristics associated with each task including an execution time of the task, a power consumption to perform the task, a memory usage to perform the task, and a bandwidth to perform the task;
  for each of different particular levels of the multiple levels:
    determine a list of possible assignment scenarios of the at least one task of the particular level to multiple processing devices as a function of technical capabilities of the multiple processing devices, wherein each assignment scenario includes an assignment of each of the at least one task of the particular level to one of the multiple processing devices,
    determine a resource cost of each of the assignment scenarios based on (i) the assigned weights of the resource characteristics associated with the at least one task of the particular level, (ii) the assignments of the at least one task of the particular level to the multiple processing devices in the assignment scenarios, and (iii) an estimated task cost for each of the tasks that is at a subsequent level beyond the particular level based on the hierarchical-dependency relationships, and
    select, for the particular level, the assignment scenario having a lowest resource cost by considering (i) the determined resource costs of the assignment scenarios for the particular level and (ii) the determined resource costs of the assignment scenarios for any other level that includes one or more tasks that must be performed earlier than the at least one task of the particular level based on the hierarchical-dependency relationships;
  build a schedule by assigning the plurality of tasks to the multiple processing devices based on the selected assignment scenario for each of the particular levels, the schedule configured to minimize power consumption of the multiple processing devices; and
  execute one or more of the plurality of tasks based on the assignment.

22. The non-transitory computer readable medium of claim 21, wherein the multiple processing devices comprise at least one of: a central processing unit (CPU), a graphics processing unit (GPU), a digital signal processor (DSP), or a core processor in a multi-core processor.

23. The non-transitory computer readable medium of claim 21, wherein the computer program further comprises computer readable program code that when executed causes the at least one processor to determine the technical capabilities by obtaining technical details of each of the multiple processing devices before determining the resource costs of the assignment scenarios.

24. The non-transitory computer readable medium of claim 21, wherein the computer readable program code that when executed causes the at least one processor to determine the resource cost of each of the assignment scenarios comprises:
  computer readable program code that when executed causes the at least one processor to at least one of:
    determine a time for at least one of the assigned processing devices to perform the at least one task; and
    determine an overall power consumed for at least one of the assigned processing devices to perform the at least one task.

25. The non-transitory computer readable medium of claim 21, wherein the estimated task cost for each of the tasks that is at the subsequent level beyond the particular level is estimated using a heuristic technique that assumes that a fastest processor is used to perform that task.

26. The non-transitory computer readable medium of claim 21, wherein the computer program further comprises computer readable program code that when executed causes the at least one processor to:
  arrange two or more of the tasks into one or more frontiers, each frontier comprising a plurality of tasks whose parent tasks have all been completed; and
  for each of the one or more frontiers, determine the list of possible assignment scenarios of the tasks of the frontier to the multiple processing devices, determine the resource cost for each of the assignment scenarios, and select the assignment scenario having the lowest resource cost, wherein each assignment scenario includes an assignment of each of the tasks of the frontier to one of the multiple processing devices, and wherein the schedule is built based on the selected assignment scenarios in all levels and frontiers.

27. The non-transitory computer readable medium of claim 21, wherein the plurality of tasks are associated with a data flow algorithm associated with an imaging or vision application.

28. The non-transitory computer readable medium of claim 21, wherein the computer readable program code that when executed causes the at least one processor to determine the list of possible assignment scenarios of the at least one task of the particular level to the multiple processing devices comprises:
  computer readable program code that when executed causes the at least one processor to:
    determine which of the multiple processing devices is capable of performing each of the at least one task of the particular level; and
    exclude from the list of possible assignment scenarios a combination of a specific processing device and a specific task when the specific processing device is not capable of performing the specific task.

29. The non-transitory computer readable medium of claim 21, wherein the resource cost for a particular processing device to perform a particular task is empirically determined.

30. The non-transitory computer readable medium of claim 21, wherein:
  the plurality of tasks are associated with a data flow algorithm, and
  the tasks are arranged into a data flow graph comprising the multiple levels.

* * * * *